Feb. 25, 1969 J. P. THOMASON 3,429,298
POULTRY HOUSE CURTAIN RAISER
Filed June 23, 1966 Sheet 3 of 3

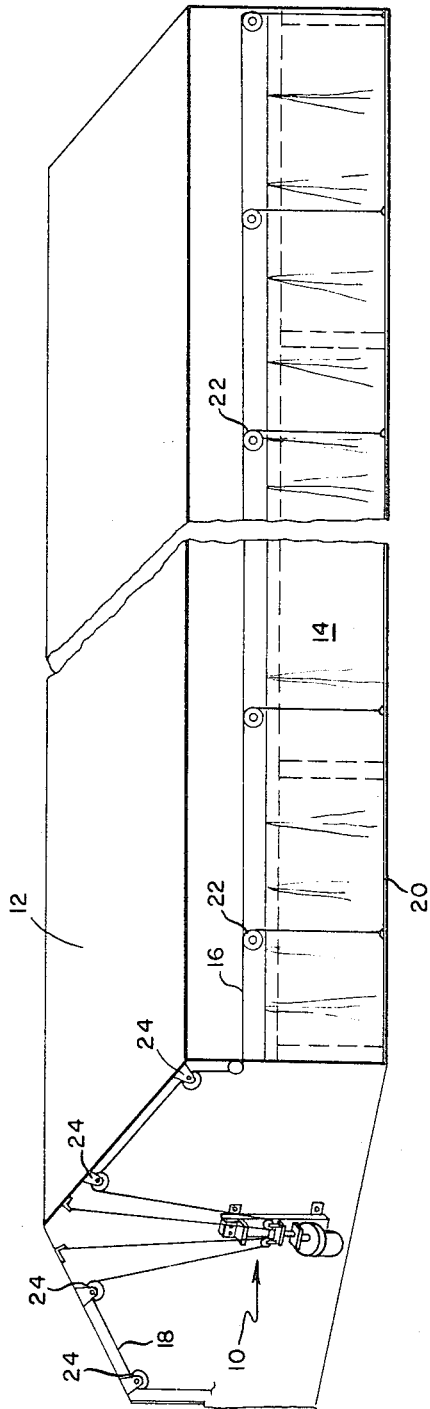
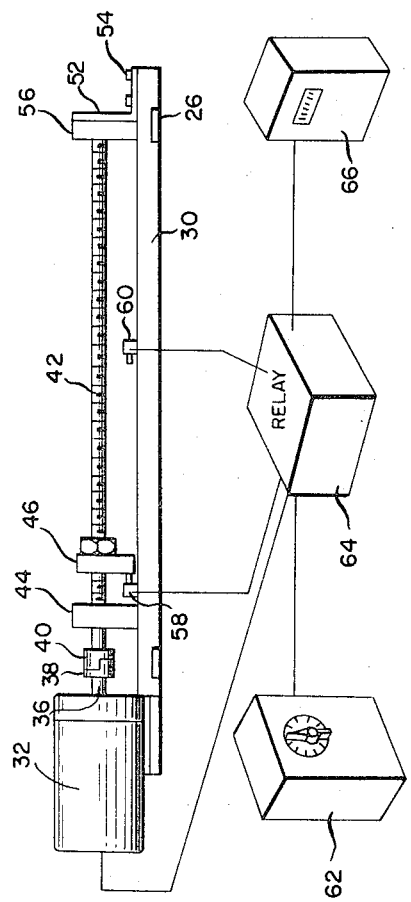

INVENTOR
JAMES P. THOMASON
BY Semmes & Semmes
ATTORNEYS

United States Patent Office 3,429,298
Patented Feb. 25, 1969

3,429,298
POULTRY HOUSE CURTAIN RAISER
James Philip Thomason, Rte. 3, Jasper, Ga. 30143
Filed June 23, 1966, Ser. No. 559,764
U.S. Cl. 119—21  5 Claims
Int. Cl. A01k *31/02;* E04f *10/02*

ABSTRACT OF THE DISCLOSURE

A poultry house curtain raising mechanism having a vertical shaft selectively rotatable in both directions and a collar riding on the vertical shaft for pulling the cables connected to curtains, the motor being driven through an electrical control mechanism including a relay, a thermostat, and a timer. There are also limit switches to prevent the over travel of the collar.

---

The present application relates to poultry houses of the type having adjustable side curtains, particularly a mechanism for raising and lowering said curtains so as to effect the desired temperature change within the poultry house.

In present day poultry or broiler house operation, the side curtains are required to be raised as much as fifteen times per 24 hours in order to maintain or achieve the desired constant temperature within the house and, simultaneously, to avoid ammonia buildup. The desired temperatures, of course, vary with the age, condition and number of poultry being housed, but may be readily determined, according to conventional tables. Traditionally, the poultry house curtain is raised manually by a winch mechanism and is reset manually after a recheck of the internal poultry house temperature. This technique is extremely time consuming and inaccurate. For, manual raising of the curtain a number of inches from the ground may provide more ventilation than is desired, resulting in a chilling of the fowl and consequent deleterious effect upon fowl health and growing conditions.

Applicant proposes to provide an automatic, curtain adjusting assembly. This assembly includes a rotary drive mechanism connected to the conventional curtain raising cables. The rotary drive mechanism includes a vertically supported threaded bolt having a movable collar mounted thereon, the collar being connected by a pulley means to the curtain raising cables. As the collar moves vertically upon rotation of the threaded bolt, the curtain is raised and lowered. A relay is employed to control operation of the motor in cooperation wth microlimit switches actuated by travel of the collar to the desired upper and lower positions, with a thermostat actuated by temperature within the house and with a timer limiting operation of the motor for the desired period and at the desired interval. This combination of controls in a threaded bolt curtain raising assembly, is not shown in the prior art.

Accordingly, it is an object of invention to provide an easily constructed, economical, automatic curtain adjusting assembly for use in poultry houses.

Another object of invention is to provide an automatic curtain adjusting assembly wherein the operation is limited by thermostat, microlimit switch and timer mechanisms.

Additional objects of invention will become apparent from the ensuing specification and attached drawings wherein:

FIG. 1 is a fragmentary, perspective, showing the curtain raising assembly positioned at one end of the poultry house and connected by a cable means to the side curtains 14;

FIG. 2 is a side elevation of the motor and threaded bolt assembly, showing the timer, relay and thermostat means schematically connected to the motor;

Figure 5:
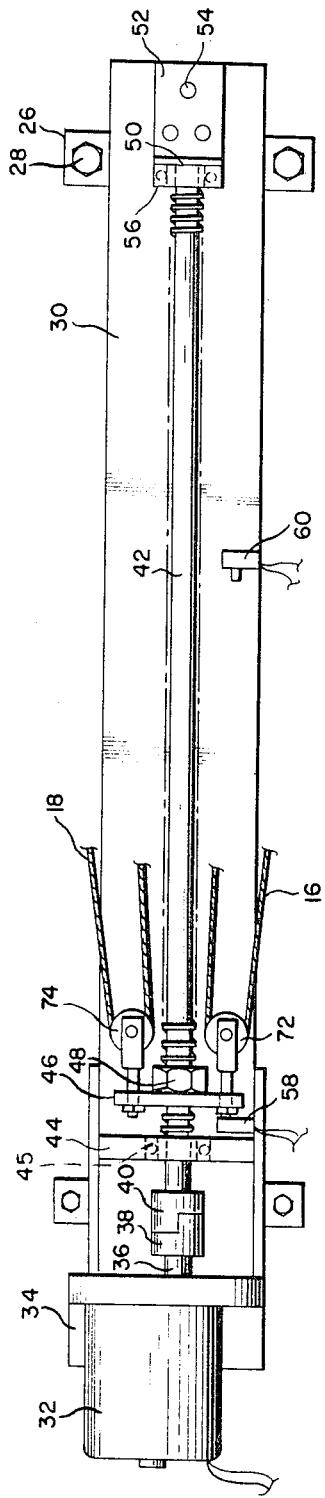
Figure 6:
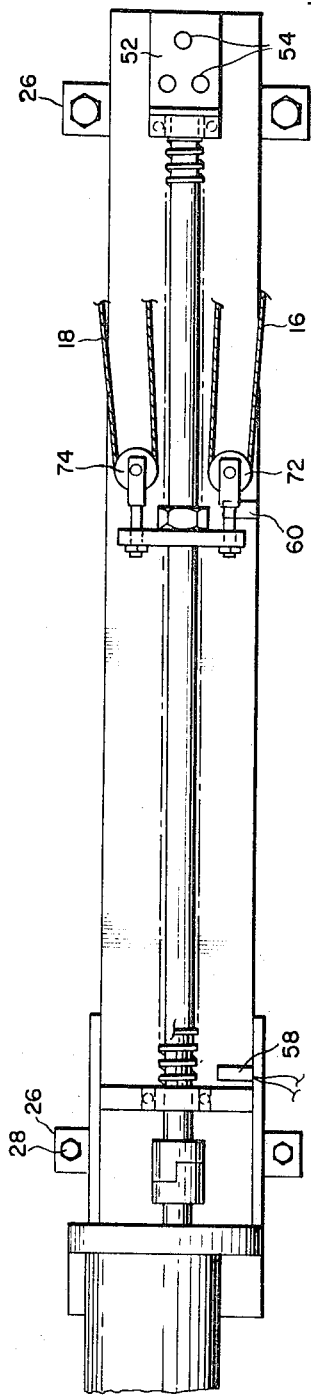

FIG. 5 is a top plan view, showing the curtain raising collar 46 contacting top microlimit switch 58 and closing off the motor as the curtain is raised to its top most position; and FIG. 6 is a view identical to that of FIG. 5, showing the curtain raising collar 46 in its bottom limit position, contacting bottom microlimit switch 60.

In FIG. 1 curtain raising rotary assembly 10 is shown as positioned at one end of poultry house 12 and connected to the poultry house side curtains 14 by means of cables 16 and 18. Cables 16 and 18 are rotatably supported upon side pulleys 22 and end pulleys 24. The entire curtain raising assembly 10 is supported upon a channel 30 having end brackets 26 for securement via bolts 28 to the sides of the poultry house 12. An electric gear motor 32 may be mounted to the channel 30 by means of motor mount 34 and have shaft 36 connected to key piece 38. Threaded curtain raiser shaft 42 is supported in end block 44 via ball bearing means 45 at the end nearest motor 32 and via block 50 having ball bearings 56. Block 50 is connected to end bracket 52, in turn secured to channel 30 by bolts 54. Threaded shaft 42 has its motor end key piece 40 for keying to piece 38 so that rotation of shaft 36 induces corresponding rotation of shaft 42.

Curtain raising collar 46 surrounds shaft 42 and is movable thereon by means of threaded nut 48 to which it may be connected by soldering or the like. As will be apparent, rotation of threaded shaft 42 induces longitudinal travel of collar 46 upon the bolt 42. As a result, curtain cables 16 and 18 connected to collar 46 by pulley 72 and 74 cause lifting or lowering of the poultry house curtains. For example, two inches of travel of collar 46 upon shaft 42 will cause a corresponding four inch raising or lowering of the poultry curtain 14. Cable 16 and 18 ends may be secured in the poultry house eaves by means of brackets 68 and 70. Manifestly, curtain cables 16 and 18 may be variously suspended in the poultry house and secured to the collar so as to induce vertical movement of the poultry house side curtains 14.

Figure 3:
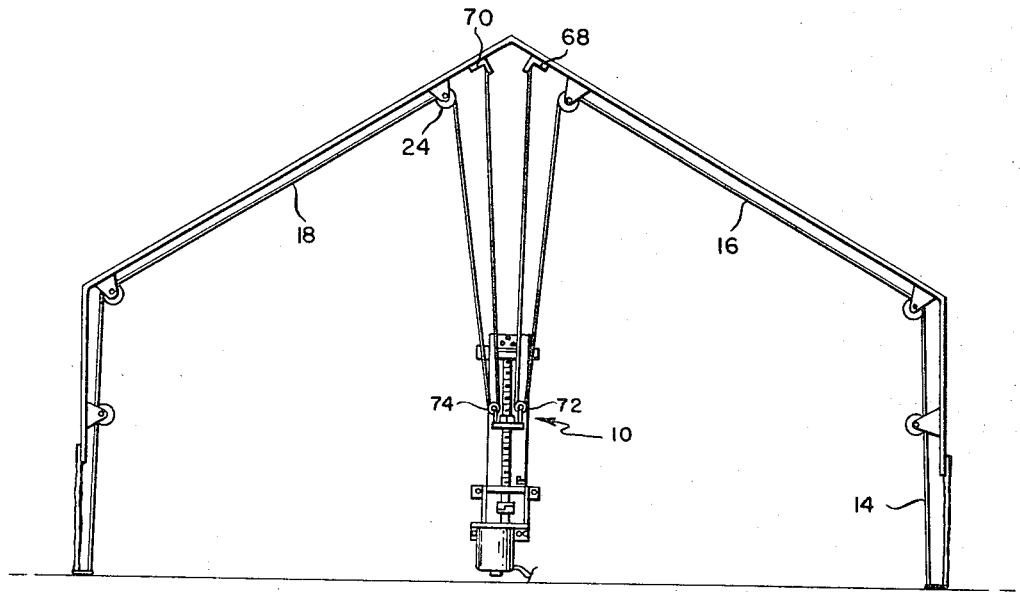
FIG. 3 is an end elevation of the curtain raiser assembly.
Figure 4:
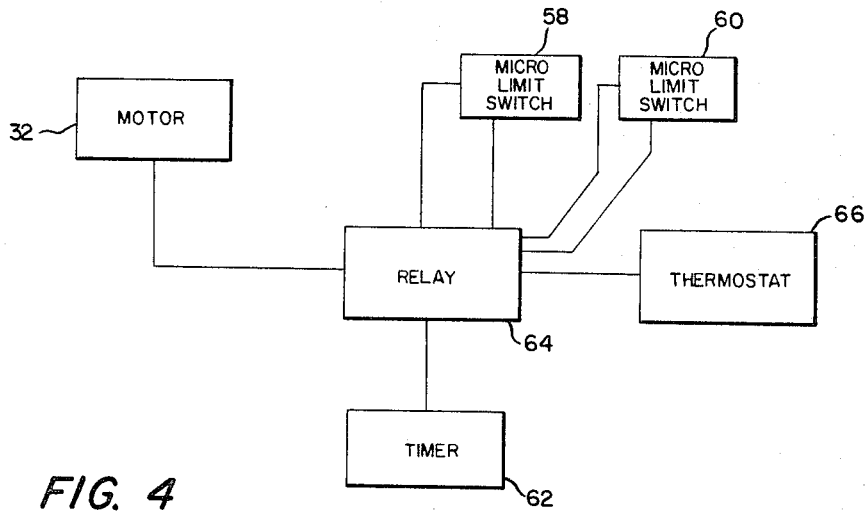
FIG. 4 is a schematic of the circuitry employed in controlling the rotary drive motor.

The electric motor control 32 includes, as illustrated in FIGS. 2 and 4, a relay 64, in turn connected to timer 62, thermostat 66 and top microlimit switch 58 and bottom microlimit switch 60.

Thermostat 66 may be set so as to cause the relay to actuate the motor driving mechanism when the poultry house temperature rises above the preset range.

Timer 62 may be set to limit the time of operation of the motor as well as the intervals between which the motor is permitted to operate. For example, timer 62 may be set to limit operation of the motor for one minute, resulting in a movement of the collar 46 for three inches upon threaded shaft 42, and the raising or lowering of the curtain a corresponding six inches.

Simultaneously, timer 62 may be set to prevent reactuation of the motor for another nine minutes. This prevents unnecessary actuation of motor 32 until the effect induced by the raised or lowered curtains 12 has been sufficiently measured by thermostat 66. Microlimit switch 58, illustrated in FIGS. 2, 5 and 6, cuts off motor 32 as it is struck by collar 46. As a result, further curtain raising action is prevented. Microlimit switch 60 positioned opposite microlimit switch 58, correspondingly limits lowering of the curtain beyond a certain point.

I claim:
1. In a poultry house of the type having at least a portion of its sides defined by adjustable curtains, a curtain adjusting assembly comprising:
   (a) a reversible electric drive motor supported upon said house and having a drive shaft extending from one end thereof;

(b) a vertically mounted threaded shaft connected to and driven by said drive shaft of said electric motor;

(c) a collar engaging said threaded shaft for vertical movement along said shaft as said shaft is rotated;

(d) cable means movably supported upon a plurality of pulleys secured to said house, said cable means interconnecting said collar and said curtains for simultaneously raising and lowering said curtains in response to movement of said collar along said threaded shaft;

(e) electrical control means for controlling the direction of rotation in which said electric motor drives said threaded shaft in response to the poultry house temperature; and (f) limit switches electrically connected to said control means for determining the extreme positions of said collar on said shaft, one of said limit switches being located adjacent said shaft at the upper extreme position of said collar and contacted by said collar as said collar is moved along said shaft to activate said electrical control means and stop the rotation of said drive shaft, and another of said limit switches located adjacent to said threaded shaft at the lower extreme position of said collar on said shaft and contacted by said collar as said collar is moved along said shaft to activate said electrical control means and stop the rotation of said drive shaft.

2. In a poultry house of the type having its lower sides defined by adjustable curtains, a curtain adjusting assembly comprising:

(a) a rotary drive mechanism supported upon said house, said rotary drive mechanism being of the electric motor type and having a drive shaft;

(b) a vertically oriented threaded shaft connected to and driven by said rotary drive mechanism;

(c) a collar engaging said threaded shaft;

(d) cable means movably supported upon a plurality of pulleys secured to said house, said cable means interconnecting said collar and said curtains;

(e) electrical control means for controlling the direction of rotation in which said drive mechanism drives said threaded shaft; and (f) limit switches electrically connected to said control means for determining the extreme positions of said collar on said shaft; said control means including:

(g) a relay;

(h) a timer connected to said relay being adjustable to limit both the time of operation of said electric motor and intervals between operation of said electric motor; and (i) a thermostat supported so as to measure the ambient air temperature in said poultry house and connected to said relay; said thermostat being responsive to temperature changes in said house to actuate said motor for operation in a given temperature range.

3. A curtain adjusting assembly as in claim 2 wherein said limit switches including:

(h) a pair of microlimit switches connected to said relay, one of said microlimit switches being supported adjacent said shaft at the bottom limit of travel of said collar upon said vertical shaft, and the other of said microlimit switches being supported adjacent said shaft at the top limit of travel of said collar, said microlimit switches cutting off said motor upon contact with said collar, so as to limit raising and lowering of said curtain.

4. A curtain adjusting assembly as in claim 3, said cables having ancillary cables connected to the curtain bottom.

5. A curtain adjusting assembly as in claim 4, said threaded shaft being rotatably supported by brackets on said channel and keyed to said electric motor drive shaft.

References Cited

UNITED STATES PATENTS

| | | |
|---|---|---|
| 1,471,454 | 10/1923 | Dolan et al. |
| 2,149,481 | 3/1939 | Van Bosch et al. ____ 160—170 |
| 2,865,328 | 12/1958 | Hostetler _____ 119—72 X |
| 3,042,001 | 7/1962 | Dubie et al. _____ 119—21 |

HUGH R. CHAMBLEE, *Primary Examiner.*

U.S. Cl. X.R.

160—170